(12) United States Patent
Chen

(10) Patent No.: US 11,122,629 B2
(45) Date of Patent: Sep. 14, 2021

(54) MEDIA ACCESS CONTROL PROTOCOL DATA UNIT TRANSMISSION METHOD, USER EQUIPMENT AND NETWORK DEVICE

(71) Applicant: VIVO MOBILE COMMUNICATION CO., LTD., Guangdong (CN)

(72) Inventor: Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/637,719

(22) PCT Filed: Aug. 7, 2018

(86) PCT No.: PCT/CN2018/099119
§ 371 (c)(1),
(2) Date: Feb. 7, 2020

(87) PCT Pub. No.: WO2019/029509
PCT Pub. Date: Feb. 14, 2019

(65) Prior Publication Data
US 2021/0007145 A1    Jan. 7, 2021

(30) Foreign Application Priority Data
Aug. 10, 2017    (CN) .......................... 201710682119.5

(51) Int. Cl.
*H04W 74/08*    (2009.01)
*H04W 76/19*    (2018.01)
(Continued)

(52) U.S. Cl.
CPC ....... *H04W 74/0833* (2013.01); *H04W 28/06* (2013.01); *H04W 36/0016* (2013.01);
(Continued)

(58) Field of Classification Search
CPC . H04W 74/0833; H04W 76/19; H04W 28/06; H04W 36/0016; H04W 72/046; H04W 74/006
(Continued)

(56) References Cited

U.S. PATENT DOCUMENTS 10,057,887 B2    8/2018  Zhao et al.
2010/0202288 A1  8/2010  Park et al.
(Continued)

FOREIGN PATENT DOCUMENTS

CN    102291836 A    12/2011
CN    102595636 A    7/2012
(Continued)

OTHER PUBLICATIONS

EP Search Report in Application No. 18844010.1 dated Jun. 30, 2020.
(Continued)

*Primary Examiner* — Danh C Le
(74) *Attorney, Agent, or Firm* — Maschoff Brennan

(57) ABSTRACT

The present disclosure provides an MPDU transmission method, a network device and a UE. The MPDU transmission method includes transmitting an MPDU. The MPDU is used to indicate types of formats of one or more RAR messages in the MPDU.

16 Claims, 8 Drawing Sheets

--- receiving an MPDU, the MPDU including a second MAC sub-header, and no RAR message corresponding to the second MAC sub-header being included in the MPDU  — S1501

↓ parsing the MPDU  — S1502

(51) Int. Cl.
*H04W 28/06* (2009.01)
*H04W 36/00* (2009.01)
*H04W 72/04* (2009.01)
*H04W 74/00* (2009.01)

(52) U.S. Cl.
CPC ....... *H04W 72/046* (2013.01); *H04W 74/006* (2013.01); *H04W 76/19* (2018.02)

(58) Field of Classification Search
USPC .......................... 370/310.2; 455/418, 550, 1
See application file for complete search history.

(56) References Cited

U.S. PATENT DOCUMENTS

| | | | | |
|---|---|---|---|---|
| 2011/0216706 | A1* | 9/2011 | Lee | H04W 74/002 370/328 |
| 2012/0002606 | A1 | 1/2012 | Vujcic | |
| 2012/0051297 | A1* | 3/2012 | Lee | H04W 80/02 370/329 |
| 2013/0114516 | A1* | 5/2013 | Koo | H04B 15/00 370/329 |
| 2015/0245387 | A1 | 8/2015 | Park et al. | |
| 2015/0319638 | A1 | 11/2015 | Rune | |
| 2017/0019893 | A1 | 1/2017 | Zhao et al. | |
| 2018/0359784 | A1* | 12/2018 | Agiwal | H04L 5/0053 |
| 2019/0116555 | A1* | 4/2019 | Kristem | H04L 27/2613 |
| 2019/0132883 | A1* | 5/2019 | You | H04L 1/1896 |
| 2020/0037394 | A1* | 1/2020 | Ohama | H04W 72/046 |
| 2020/0112894 | A1* | 4/2020 | Koshimizu | H04W 36/0022 |
| 2020/0170044 | A1* | 5/2020 | Kim | H04B 7/08 |
| 2020/0178308 | A1* | 6/2020 | Chen | H04W 28/065 |
| 2021/0029603 | A1* | 1/2021 | Kim | H04W 60/00 |

FOREIGN PATENT DOCUMENTS

| | | |
|---|---|---|
| CN | 103874049 A | 6/2014 |
| CN | 103987106 A | 8/2014 |
| CN | 104579541 A | 4/2015 |
| CN | 104936235 A | 9/2015 |
| EP | 2 205 037 A1 | 7/2010 |
| GN | 102595636 A | 7/2012 |
| GN | 103874049 A | 6/2014 |
| GN | 104936235 A | 9/2015 |

OTHER PUBLICATIONS

CN Office Action in Application No. 201710682119.5 dated Aug. 12, 2019.
Written Opinion and International Search Report in Application No. PCT/CN2018/099119 dated Feb. 27, 2020.

* cited by examiner

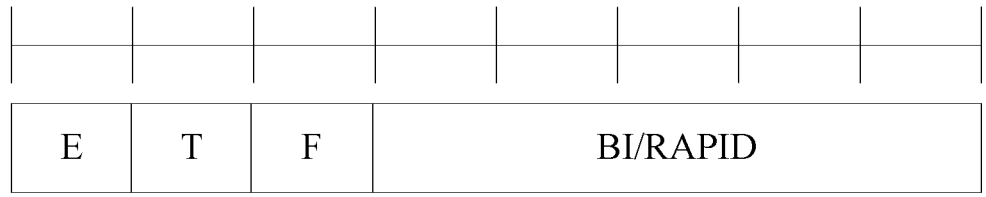
FIG. 1
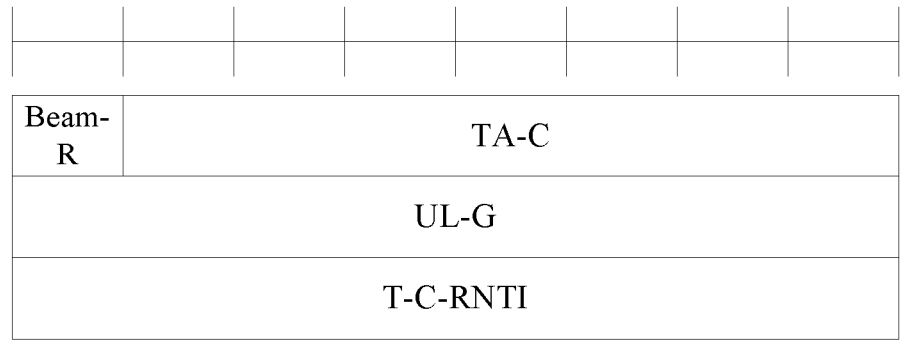
FIG. 2
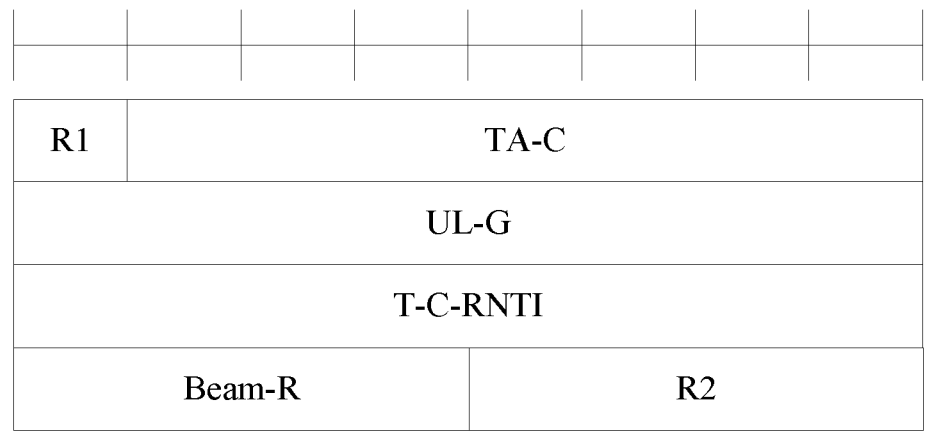
FIG. 3
FIG. 4 transmitting an MPDU, the MPDU including a second MAC sub-header, and no RAR message corresponding to the second MAC sub-header being included in the MPDU — S1301

FIG. 13 receiving an MPDU, the MPDU being used to indicate types of formats of one or more RAR messages in the MPDU — S1401 parsing the MPDU — S1402

FIG. 14 receiving an MPDU, the MPDU including a second MAC sub-header, and no RAR message corresponding to the second MAC sub-header being included in the MPDU — S1501 parsing the MPDU — S1502

FIG. 15

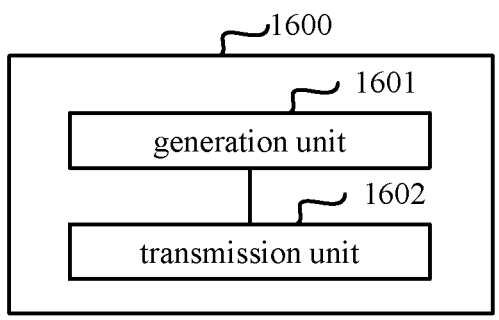

FIG. 16

MEDIA ACCESS CONTROL PROTOCOL DATA UNIT TRANSMISSION METHOD, USER EQUIPMENT AND NETWORK DEVICE

CROSS-REFERENCE TO RELATED APPLICATION

The present application is the U.S. national phase of PCT Application No. PCT/CN2018/099119 filed on Aug. 7, 2018, which claims a priority of the Chinese patent application 201710682119.5 filed on Aug. 10, 2017, which are incorporated herein by reference in their entirety.

TECHNICAL FIELD

The present disclosure relates to the field of communication technology, in particular to a Media Access Control (MAC) Protocol Data Unit (MPDU) transmission method, a User Equipment (UE), and a network device.

BACKGROUND

Downlink Signals are transmitted by a network device through beam scanning, so when an uplink random access process is initiated by a UE, the network device may configure an uplink random access resource corresponding to each downlink beam, i.e., a Physical Random Access Channel (PRACH) resource, for the UE, and reference signals corresponding to the downlink beam include a CSI-RS and/or an SS block.

After the UE has selected a corresponding downlink reception beam, an msg1 may be transmitted by the UE through the uplink random access resource corresponding to the beam, i.e., a PRACH. Upon the receipt of the msg1 from the UE, the network device may transmit an msg2, i.e., Random Access Response (RAR), on a downlink beam corresponding to the random access resource. The UE may monitor an RAR message corresponding to the msg1 on a corresponding downlink beam within a configured RAR window.

An existing RAR message has a relatively single format, and it principally carries a Timing Advance (TA) command, uplink (UL) grant, and a Temporary Cell Radio Network Temporary Identifier (T-C-RNTI).

SUMMARY

An object of the present disclosure is to provide an MPDU transmission method, a UE and a network device, so as to solve the problems in the related art.

In a first aspect, the present disclosure provides in some embodiments an MPDU transmission method, including transmitting an MPDU. The MPDU is used to indicate types of formats of one or more RAR messages in the MPDU.

In a second aspect, the present disclosure provides in some embodiments an MPDU transmission method, including transmitting an MPDU. The MPDU includes a second MAC sub-header, and no RAR message corresponding to the second MAC sub-header is included in the MPDU.

In third aspect, the present disclosure provides in some embodiments an MPDU transmission method, including: receiving an MPDU, the MPDU being used to indicate types of formats of one or more RAR messages in the MPDU; and parsing the MPDU.

In a fourth aspect, the present disclosure provides in some embodiments an MPDU transmission method, including: receiving an MPDU, the MPDU including a second MAC sub-header, and no RAR message corresponding to the second MAC sub-header being included in the MPDU; and parsing the MPDU.

In a fifth aspect, the present disclosure provides in some embodiments a network device, including: a generation unit configured to generate an MPDU; and a transmission unit configured to transmit the MPDU. The MPDU is used to indicate types of formats of one or more RAR messages in the MPDU.

In a sixth aspect, the present disclosure provides in some embodiments a network device, including: a generation unit configured to generate an MPDU, the MPDU including a second MAC sub-header, no RAR message corresponding to the second MAC sub-header being included in the MPDU; and a transmission unit configured to transmit the MPDU.

In a seventh aspect, the present disclosure provides in some embodiments a UE, including: a reception unit configured to receive an MPDU, the MPDU being used to indicate types of formats of one or more RAR messages in the MPDU; and a parsing unit configured to parse the MPDU.

In an eighth aspect, the present disclosure provides in some embodiments a UE, including: a reception unit configured to receive an MPDU, the MPDU including a second MAC sub-header, and no RAR message corresponding to the second MAC sub-header being included in the MPDU; and a parsing unit configured to parse the MPDU.

In a ninth aspect, the present disclosure provides in some embodiments a network device, including a processor, and a memory storing therein a computer-executable instruction. The processor is configured to execute the computer-executable instruction so as to implement the MPDU transmission method in the first aspect.

In a tenth aspect, the present disclosure provides in some embodiments a computer-readable storage medium storing therein one or more programs. The one or more programs are executed by an electronic device including a plurality of applications so as to implement the MPDU transmission method in the first aspect.

In an eleventh aspect, the present disclosure provides in some embodiments a network device, including a processor, and a memory storing therein a computer-executable instruction. The processor is configured to execute the computer-executable instruction so as to implement the MPDU transmission method in the second aspect.

In a twelfth aspect, the present disclosure provides in some embodiments a computer-readable storage medium storing therein one or more programs. The one or more programs are executed by an electronic device including a plurality of applications so as to implement the MPDU transmission method in the second aspect.

In a thirteenth aspect, the present disclosure provides in some embodiments a UE, including a processor, and a memory storing therein a computer-executable instruction. The processor is configured to execute the computer-executable instruction so as to implement the MPDU transmission method in the third aspect.

In a fourteenth aspect, the present disclosure, the present disclosure provides in some embodiments a computer-readable storage medium storing therein one or more programs. The one or more programs are executed by an electronic device including a plurality of applications so as to implement the MPDU transmission method in the third aspect.

In a fifteenth aspect, the present disclosure provides in some embodiments a UE, including a processor, and a memory storing therein a computer-executable instruction.

The processor is configured to execute the computer-executable instruction so as to implement the MPDU transmission method in the fourth aspect.

In a sixteenth aspect, the present disclosure, the present disclosure provides in some embodiments a computer-readable storage medium storing therein one or more programs. The one or more programs are executed by an electronic device including a plurality of applications so as to implement the MPDU transmission method in the fourth aspect.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIG. 1 is a flow chart of an MPDU transmission method according to some embodiments of the present disclosure;

FIG. 2 is a schematic view showing a format of an MAC sub-header according to some embodiments of the present disclosure;

FIG. 3 is a schematic view showing a message format of an RAR message according to some embodiments of the present disclosure;

FIG. 4 is another schematic view showing the message format of the RAR message according to some embodiments of the present disclosure;

FIG. 13 is a flow chart of an MPDU transmission method according to some embodiments of the present disclosure;

FIG. 14 is a flow chart of an MPDU transmission method according to some embodiments of the present disclosure;

FIG. 15 is a flow chart of an MPDU transmission method according to some embodiments of the present disclosure;

FIG. 16 is a schematic view showing a network device according to some embodiments of the present disclosure;

DETAILED DESCRIPTION

Figure 5:
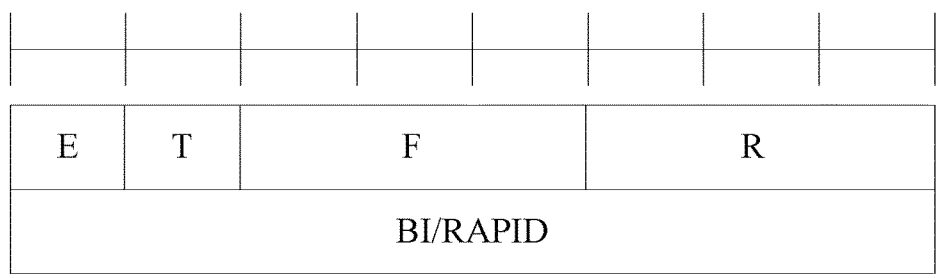
FIG. 5 is another schematic view showing the format of the MAC sub-header according to some embodiments of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An object of the present disclosure is to provide an MPDU transmission method, a UE and a network device, so as to enable the network device and the UE to exchange messages in a more flexible and convenient manner.

The scheme in the embodiments of the present disclosure may be applied to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE)/Long Term Evolution Advanced (LTE-A) system, a New Radio (NR) system.

A UE, also called as mobile terminal or mobile user device, may communication with one or more core networks via a Radio Access Network (RAN). The UE may be a mobile terminal, e.g., a mobile phone (or cellular phone) and a computer having a mobile terminal, e.g., a portable, pocket-size, handheld, built-in or vehicle-mounted mobile device capable of exchanging voice and/or data with the RAN.

A base station may be, but not limited to, a Base Transceiver Station (BTS) in the GSM or CDMA system, a Node B in the WCDMA system, an evolved Node B (eNB, or e-Node B) in the LTE system, or a $5^{th}$-Generation (5G) base station (gNB). In the following description, the gNB may be taken as an example.

A PDU may refer to a data unit transmitted between peer-to-peer layers. For a physical layer, the PDU may be a data bit; for a data link layer, the PDU may be a data frame; for a network layer, the PDU may be a data packet; for a transmission layer, the PDU may be a data segment; and for any other higher layer, the PDU may be a message.

For an MPDU, in the radio network security, an MAC Service Data Unit (MSDU) is subject to Message Integrity Check (MIC), framing, addition of IV, encryption, and addition of an MAC header, so as to form the MPDU.

As shown in FIG. 1, the present disclosure provides in some embodiments an MPDU transmission method for a network device, including Step S101 of transmitting an MPDU. The MPDU is used to indicate types of formats of one or more RAR messages in the MPDU.

Of course, it should be appreciated that, prior to transmitting the MPDU, the MPDU transmission method may further include generating the MPDU.

According to the embodiments of the present disclosure, through transmitting the MPDU indicating the types of the formats of the RAR message, it is able for the network device and a UE to use different formats of the RAR messages according to the practical need and achieve different functions through different information carried in the RAR messages, thereby to enlarge an available range of a random access process, and enable the network device and the UE to exchange messages in more flexible and convenient manner.

Of course, it should be appreciated that, in some embodiments of the present disclosure, the types of the formats of the one or more RAR messages in the MPDU may be directly indicated through indication information in the MPDU, or indirectly indicated through resource position information in the MPDU.

The following description will be given when the types of the formats of the one or more RAR messages are directly indicated through the indication information in the MPDU.

In a possible embodiment of the present disclosure, at least one first MAC sub-header of the MPDU may include an RAR format indication field for indicating a format of at least one first RAR message corresponding to the first MAC sub-header.

In some embodiments of the present disclosure, the type of the format of the RAR message corresponding to each MAC sub-header may be indicated through the RAR format indication field in the MAC sub-header, so as to support the MPDU to providing different formats of the RAR messages corresponding to different MAC sub-headers.

In a possible embodiment of the present disclosure, the RAR format indication field may indicate whether the at least one first RAR message is an RAR Message including a response indication field. The response indication field may be used to indicate a beam failure recovery request response. It should be appreciated that, the beam failure recovery request response may include a response indicating that a beam failure recovery request has been received or has not been received.

In a possible embodiment of the present disclosure, the RAR format indication field may use a reserved bit in the MAC sub-header, or a newly-added bit in the MAC sub-header different from the reserved bit.

For example, the first MAC sub-header may include an extended bit, a type bit, the RAR format indication field, and a Backoff Indicator (BI)/Random Access Preamble Identity (RAPID) field. The RAR format indication field may use the reserved bit to represent whether the first RAR message corresponding to the first MAC sub-header includes the beam failure recovery request response.

FIG. 2 shows a format of the MAC sub-header. As shown in FIG. 2, the first MAC sub-header includes an extended bit E, a type bit T, a format indication field F and a BI/RAPID field. The format indication field F may occupy a reserved bit R for representing whether the first RAR message corresponding to the first MAC sub-header includes the beam failure recovery request response. IN addition, the use of the extended bit E/the type bit T and the BI/RAPID field is similar to that in the related art. For example, the extended bit E, also called as an E field, may be used to indicate whether there are more fields in the MAC header, 1 represents that there is at least one E/T/RAPID field subsequently, and 0 represents that there is an RAR message or padding. The type bit T may be used to represent whether the BI or the RAPID is stored in the BI/RAPID field.

Of course, it should be appreciated that, the format of the MAC sub-header in FIG. 2 is merely for illustrative purposes, and in actual use, the MAC sub-header may be in different formats.

For example, the first MAC sub-header may include the extended bit, the type bit, a first reserved bit, the BI/RAPID field, the RAR format indication field and zero or more second reserved bits. The RAR format indication field may be used to represent whether the first RAR message corresponding to the first MAC sub-header includes the beam failure recovery request response.

It should be appreciated that, the RAR format indication field may include one or more bits.

In a possible embodiment of the present disclosure, when the RAR format indication field indicates that the at least one first RAR message is an RAR message not including the response indication field, the first RAR message may be in a known format.

In a possible embodiment of the present disclosure, when the RAR format indication field indicates that the at least one first RAR message is an RAR message including the response indication field, the first RAR message may be in the known format, with a reserved bit as the response indication field.

For example, the first RAR message may include the response indication field, a TA COMMAND field, a UL grant field, and a TEMPORARY C-RNTI field.

FIG. 3 also shows a format of the RAR Message. As shown in FIG. 3, the RAR message carry the beam failure recovery request message may include a response indication field Beam-R, a TA COMMAND field TA-C, a UL grant field UL-G, and a TEMPORARY C-RNTI field T-C-RNTI. The response indication field Beam-R may be a reserved bit.

In a possible embodiment of the present disclosure, when the RAR format indication field indicates that the at least one first RAR message is an RAR Message including the response indication field, the first RAR message may be in a format different from the known format, with one or more newly-added bits as the response indication field.

For example, the first RAR Message may include a first reserved bit, the TA COMMAND field, the UL grant field, the TEMPORARY C-RNTI field, the response indication field, and zero or more second reserved bits.

FIG. 4 also shows a format of the RAR message. As show in FIG. 4, the RAR message carrying the beam failure recovery request response may include a first reserved bit R1, a TA COMMAND field TA-C, a UL grant field UL-G, a TEMPORARY C-RNTI field T-C-RNTI, a response indication field Beam-R, and a second reserved bit R2.

Of course, it should be appreciated that, FIG. 3 and FIG. 4 merely show parts of the formats of the RAR message carrying the beam failure recovery request response. The RAR message may further carry information about the other fields, and/or one or more fields in the RAR message may be removed, which will not be particularly defined herein. It should be further appreciated that, the fields in the RAR message may also be arranged in any other mode, which will not be particularly defined herein.

In a possible embodiment of the present disclosure, the RAR format indication field may indicate the format of the at least one first RAR message through indicating at least one of the following information types to be carried in the at least one first RAR message: the TA command; the UL grant; the T-C-RNTI; the response indication field indicating the beam failure recovery request response; acknowledgement information about a downlink beam in candidate downlink beams reported by the UE corresponding to a currently-used uplink beam; acknowledgement information about downlink beams other than the downlink beam in the candidate downlink beams reported by the UE corresponding to the currently-used uplink beam; an indicator indicating the handover to the other candidate downlink beam; an indicator indicating the handover to the other downlink beam; an indicator indicating the restart of beam searching; an indicator indicating the handover to the other candidate beam or the restart of the beam searching; an indicator indicating available downlink beams in the candidate downlink beams reported by the UE; and an indicator indicating the available downlink beams.

Similarly, the RAR format indication field may use the reserved bit in the MAC sub-header, or a newly-added bit different from the reserved bit in the MAC sub-header.

FIG. 5 shows a format of the MAC sub-header. As shown in FIG. 5, the MAC sub-header includes an extended bit E, a type bit T, an RAR format indication field F, zero or several reserved bits R, and a BI/RAPID field. The extended bit E, the type bit T the reserved bits R and the BI/RAPID field may function as those in the related art. The RAR format indication field F may be used to indicate an information type carried in the at least one RAR message corresponding to the MAC sub-header.

Figure 6:
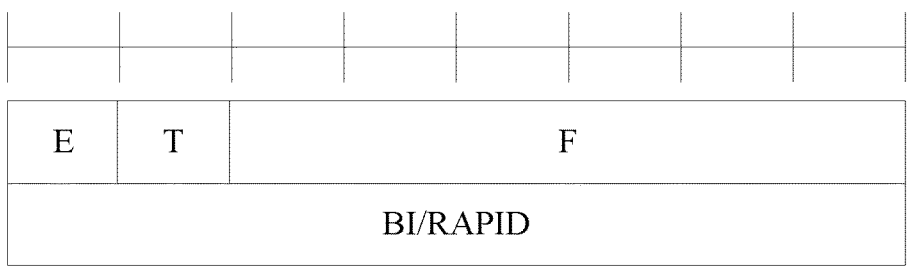
FIG. 6 is yet another schematic view showing the format of the MAC sub-header according to some embodiments of the present disclosure.

FIG. 6 also shows the format of the MAC sub-header. As shown in FIG. 6, the MAC sub-header includes an extended bit E, a type bit T, an RAR format indication field F, and a BI/RAPID field. The extended bit E, the type bit T and the BI/RAPID may function as those in the related art. The RAR format indication field F may be used to indicate an information type carried in the at least one RAR message corresponding to the MAC sub-header.

It should be appreciated that, in the embodiments of the present disclosure, one RAR message format may correspond to one combination mode of the above information types. The more the bits of the RAR format indication field, the more the format types of the RAR messages capable of being indicated in the RAR format indication field.

It should be further appreciated that, in the embodiments of the present disclosure, one bit may be used to represent one information type, or more than one information types. For example, for a certain bit, 1 represents that the RAR message includes the TA command and the UL grant, and 0 represents that the RAR message does not include the TA command and the UL grant. For another example, a certain bit may be used to indicate the handover to the other candidate downlink beam or an indicator indicating the restart of the beam searching, where 0 represents the handover to the other candidate downlink beam, and 1 represents the indicator indicating the restart of the beam searching.

Figure 7:
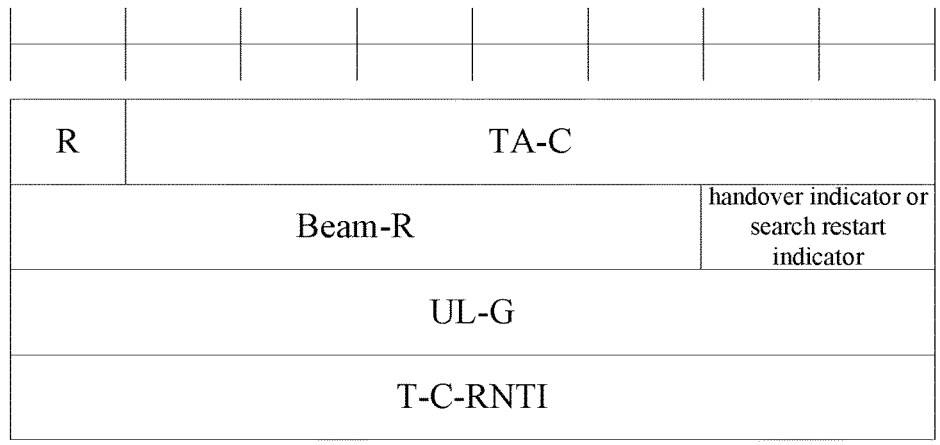
FIG. 7 is yet another schematic view showing the format of the RAR message according to some embodiments of the present disclosure.

FIG. 7 also shows the format of the RAR message. As shown in FIG. 7, the RAR message includes a reserved bit, a TA COMMAND field TA-C, a response indication field Beam-R, a handover indication field or a search restart indication field, a UL grant field UL-G, and a TEMPORARY C-RNTI field T-C-RNTI.

It should be appreciated that, in the embodiments of the present disclosure, each first RAR message of the at least one RAR message corresponding to the first MAC sub-header may be used to carry one or more types of the at least one type of information.

For example, when the RAR messages corresponding to a certain MAR sub-header includes an RAR 1 and an RAR 2, the RAR 1 may carry the TA command and the UL grant, and the RAR 2 may carry the indicator indicating the restart of the beam searching.

It should be appreciated that, in the embodiments of the present disclosure, merely one first RAR message may correspond to one first MAC sub-header, so as to carry all the information types indicated by the RAR format indication field. In addition, a plurality of first RAR messages may correspond to one first MAC sub-header, each first RAR message may carry one or more of the information types indicated by the RAR format indication field, and the information types carried by each first RAR message of the plurality of first RAR messages corresponding to one first MAC sub-header may overlap the information types carried by the other first RAR messages of the plurality of first RAR messages corresponding to the first MAC sub-header.

Next, the following description will be given when the types of the formats of the one or more RAR messages are briefly indicated through resource position information in the MPDU.

In a possible embodiment of the present disclosure, Step S101 may include transmitting the MPDU at a resource position of the MPDU corresponding to a format of a first RAR message. There may exist a mapping between resource positions of the MPDU and the formats of the first RAR messages in the MPDU.

It should be appreciated that, in the embodiments of the present disclosure, the resource position information may include at least one of a time-domain resource position, a frequency-domain resource position, a preamble position, a beam resource position, and a frequency-domain/time-domain resource position of a Synchronization Signal (SS) block/Channel Status Information Reference Signal (CSI-RS) corresponding to a beam.

In a possible embodiment of the present disclosure, the resource position information may be used to indicate whether at least one first RAR message corresponding to any first MAC sub-header in the MPDU is an RAR message including the response indication field, and the response indication field may be used to indicate the beam failure recovery request response.

In a possible embodiment of the present disclosure, when the RAR format indication field indicates that the at least one first RAR message is an RAR message not including the response indication field, the first RAR message may be in the known format.

In a possible embodiment of the present disclosure, when the RAR format indication field indicates that the at least one first RAR message is an RAR message including the response indication field, the first RAR message may be in a format different from the known format, with one or more newly-added bits as the response indication field, with reference to the above-mentioned mode where the RAR format indication field indicates whether the first RAR message corresponding to the first MAC sub-header includes the beam failure recover request response as well as the RAR message formats in FIG. 3 and FIG. 4.

In a possible embodiment of the present disclosure, the resource position information may be used to indicate the format of the at least one first RAR message through indicating at least one of the following types of information to be carried in the at least one first RAR message corresponding to any first MAC sub-header in the MPDU: the TA command; the UL grant; the T-C-RNTI; the response indication field indicating the beam failure recovery request response; acknowledgement information about a downlink beam in candidate downlink beams reported by the UE corresponding to a currently-used uplink beam; acknowledgement information about downlink beams other than the downlink beam in the candidate downlink beams reported by the UE corresponding to the currently-used uplink beam; an indicator indicating the handover to the other candidate downlink beam; an indicator indicating the handover to the other downlink beam; an indicator indicating the restart of beam searching; an indicator indicating the handover to the other candidate beam or the restart of the beam searching; an indicator indicating available downlink beams in the candidate downlink beams reported by the UE; and an indicator indicating the available downlink beams.

It should be appreciated that, in the embodiments of the present disclosure, each first RAR message in the at least one RAR message corresponding to the first MAC sub-header may be used to carry one or more types of the at least one type of information. Merely one first RAR message may correspond to one first MAC sub-header, so as to carry all the information types indicated by the RAR format indication field. In addition, a plurality of first RAR messages may correspond to one first MAC sub-header, each first RAR message may carry one or more of the information types indicated by the RAR format indication field, and the information types carried by each first RAR message of the plurality of first RAR messages corresponding to one first MAC sub-header may overlap the information types carried by the other first RAR messages of the plurality of first RAR messages corresponding to the first MAC sub-header.

In a possible embodiment of the present disclosure, when the RAR message includes the response indication field, the response indication field may use the reserved bit in the RAR message, or one or more newly-added bits in the RAR message different from the reserved bit.

Of course, it should be appreciated that, apart from the first MAC sub-header corresponding to the RAR messages, the MPDU may further include the MAC sub-headers of any other types.

In a possible embodiment of the present disclosure, the MPDU may further include a second MAC sub-header, and no RAR message corresponding to the second MAC sub-header may be included in the MPDU.

In the embodiments of the present disclosure, an indication may be transferred through the MAC sub-header not including the corresponding RAR message, it is able to improve the resource utilization.

In a possible embodiment of the present disclosure, the second MAC sub-header may be used to indicate the beam failure recovery request response.

Figure 8:
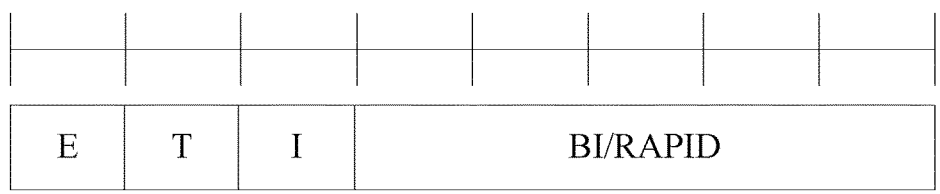
FIG. 8 is still yet another schematic view showing the format of the MAC sub-header according to some embodiments of the present disclosure.

Alternatively, in a possible embodiment of the present disclosure, the second MAC sub-header may include a response indication field, and the response indication field may be used to indicate the beam failure recovery request response. FIG. 8 also shows the format of the MAC sub-header. As shown in FIG. 8, the RAR message indication field may include an extended bit E, a type bit T, a response indication field I and a BI/RAPID field. There is not corresponding RAR Message corresponding to the MAC sub-header, and the response indication field I may be used to indicate whether there is a subsequent RAR message after the MAC sub-header. It should be appreciated that, the response indication field may use the reserved bit in the MAC sub-header, or one or more newly-added bits in the MAC sub-header different from the reserved bit.

Alternatively, in a possible embodiment of the present disclosure, the second MAC sub-header may include an RAR message indication field, and the RAR message indication field may be used to indicate whether there is a subsequent RAR message after the second MAC sub-header. As shown in FIG. 8, the RAR message indication field may include an extended bit E, a type bit T, an RAR message indication field I and a BI/RAPID field. There is no corresponding RAR message corresponding to the MAC sub-header, and the RAR message indication field I may be used to indicate whether there is a subsequent RAR message after the MAC sub-header. It should be appreciated that, the RAR message indication field may use the reserved bit in the MAC sub-header, or one or more newly-added bits in the MAC sub-header different from the reserved bit. It should be appreciated that, the implementation mode of the RAR message indication field may be used in combination with any of the above two implementation modes.

Alternatively, in a possible embodiment of the present disclosure, Step S101 may include: determining a resource position of the MPDU in accordance with the beam failure recovery request response, the resource position of the MPDU being used to indicate the beam failure recovery request response; and transmitting the MPDU at the resource position.

Alternatively, in a possible embodiment of the present disclosure, Step S101 may include: determining a resource position of the MPDU in accordance with whether there is the subsequent RAR message after the second MAC sub-header, the resource position being used to indicate whether there is the subsequent RAR message after the second MAC sub-header; and transmitting the MPDU at the resource position.

In a possible embodiment of the present disclosure, the MAC sub-headers and the RAR messages may be arranged in the MPDU as follows: each MAC sub-header of the MPDU may be located in an MAC header of the M PDU, and the RAR messages corresponding to the MAC sub-headers may be located after the MAC header in accordance with an order of the MAC sub-headers.

Figure 9:
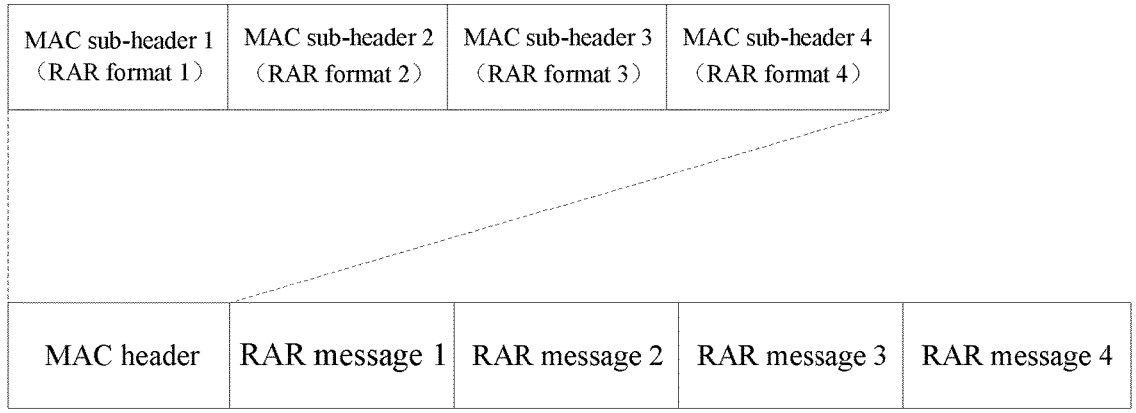
FIG. 9 is a schematic view showing a format of an MPDU according to some embodiments of the present disclosure.

FIG. 9 shows a format of the MPDU. As shown in FIG. 9, the MPDU includes MAC sub-headers 1 to 4 carrying RAR formats 1 to 4 respectively, and the RAR formats 1 to 4 are used to indicate the message formats of RAR messages 1 to 4 respectively. In FIG. 9, the MAC header may include MAC sub-headers 1 to 4. The RAR messages 1 to 4 corresponding to the MAC sub-headers 1 to 4 respectively may be arranged subsequently after the MAC header in accordance with the order of the MAC sub-headers 1 to 4.

Of course, FIG. 9 merely shows an example where one MAC sub-header corresponds to one RAR message. It should be appreciated that, in some embodiments of the present disclosure, one MAC sub-header may correspond to one or more RAR messages.

Alternatively, in a possible embodiment of the present disclosure, the MAC sub-headers and the RAR messages may be arranged in the MPDU as follows: the MAC sub-headers may be arranged in the MAC header of the MPDU, and the RAR messages corresponding to the MAC sub-headers including the RAR messages may be arranged after the MAC header in accordance with the order of the MAC sub-headers.

To be specific, for any first MAC sub-header of the MAC sub-headers in the MPDU, when there is a second RAR message corresponding to the first MAC sub-header and the second RAR message is a first one of the RAR messages, the second RAR message may be located after and adjacent to the MAC header. When the second RAR message is not a first one of the RAR messages, the second RAR message may be located after a third RAR message, and the third RAR message may be an RAR Message corresponding to one second MAC sub-header located immediately before the first MAC sub-header and including the corresponding RAR message.

Figure 10:
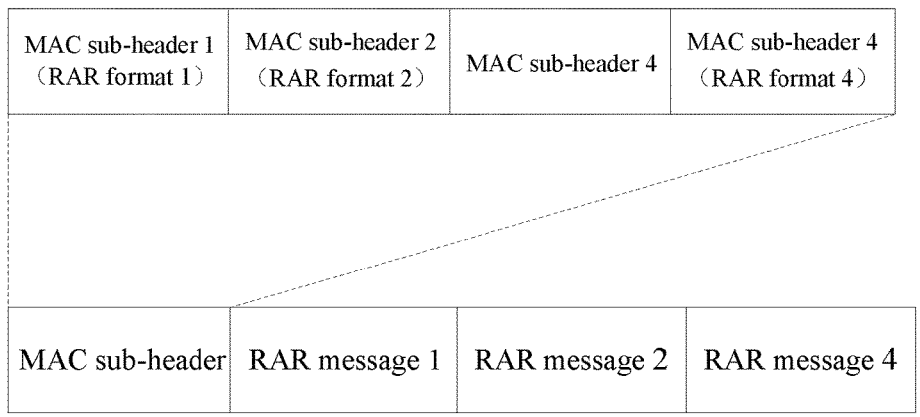
FIG. 10 is another schematic view showing the format of the MPDU according to some embodiments of the present disclosure.

FIG. 10 also shows the format of the MPDU. As shown in FIG. 10, the MPDU may include MAC sub-headers 1 to 4. The MAC sub-headers 1, 2 and 4 may carry RAR formats 1, 2 and 4 respectively, for indicating the message formats of RAR messages 1, 2 and 4 respectively. The MAC sub-header 3 may not include any corresponding RAR message. In FIG. 10, the MAC header may include the MAC sub-headers 1 to 4, and the RAR messages 1, 2 and 4 corresponding to the MAC sub-headers including the RAR messages may be located sequentially after the MAC header in accordance with the order of the corresponding MAC sub-headers.

Similarly, in some embodiments of the present disclosure, one MAC sub-header may correspond to one or more RAR messages.

Alternatively, in a possible embodiment of the present disclosure, the MAC sub-headers and the RAR messages may be arranged in the MPDU as follows: the RAR message corresponding to each MAC sub-header in the MPDU may be located within a field subsequent to the MAC sub-header.

Figure 11:
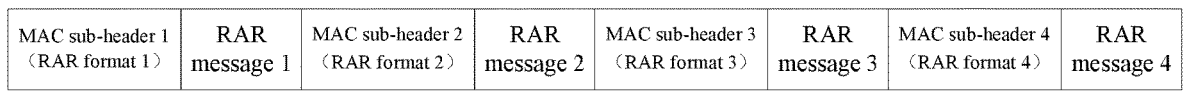
FIG. 11 is yet another schematic view showing the format of the MPDU according to some embodiments of the present disclosure.

FIG. 11 also shows the format of the MPDU. As shown in FIG. 11, the MPDU may include MAC sub-headers 1 to 4 carrying RAR formats 1 to 4 respectively, and the RAR formats 1 to 4 may be used to indicate the message formats of RAR messages 1 to 4 respectively. In FIG. 11, the MAC sub-header 1, the RAR message 1 corresponding to the MAC sub-header 1, the MAC sub-header 2, the RAR message 2 corresponding to the MAC sub-header 1, the MAC sub-header 3, the RAR message corresponding to the MAC sub-header 1, the MAC sub-header 4, and the RAR message 4 corresponding to the MAC sub-header 1 may be arranged sequentially.

Similarly, in some embodiments of the present disclosure, one MAC sub-header may correspond to one or more RAR messages.

Alternatively, in a possible embodiment of the present disclosure, the MAC sub-headers and the RAR messages may be arranged in the MPDU as follows: the RAR message corresponding to each MAC sub-header in the MPDU including the RAR message may be located in a field subsequent to the MAC sub-header.

To be specific, for any third MAC sub-header of the MAC sub-headers in the MPDU, when there is a fourth RAR message corresponding to the third MAC sub-header, the fourth RAR message may be located in a field subsequent to the third MAC sub-header. When there is no fourth RAR message corresponding to the third MAC sub-header and the third MAC sub-header is not a last MAC sub-header, a subsequent MAC sub-header may be located in a field subsequent to the third MAC sub-header.

Figure 12:
FIG. 12 is still yet another schematic view showing the format of the MPDU according to some embodiments of the present disclosure.

FIG. 12 also shows the format of the MPDU. As shown in FIG. 12, the MPDU may include MAC sub-headers 1 to 4. The MAC sub-headers 1, 2 and 4 may carry RAR formats 1, 2 and 4 respectively, for indicating the message formats of RAR messages 1, 2 and 4 respectively. There is no RAR message corresponding to the MAC sub-header 3. In FIG. 12, the MAC sub-header 1, the RAR message 1 corresponding to the MAC sub-header 1, the MAC sub-header 2, the RAR message 2 corresponding to the MAC sub-header 1, the MAC sub-header 3, the MAC sub-header 4, and the RAR message 4 corresponding to the MAC sub-header 1 may be arranged sequentially.

Each MAC sub-header may be further used to indicate whether there is the corresponding RAR message, or the quantity of the corresponding RAR messages.

The present disclosure further provides in some embodiments an MPDU transmission method for a network device, which includes Step S1301 of transmitting an MPDU. The MPDU may include a second MAC sub-header, and no RAR message corresponding to the second MAC sub-header may be included in the MPDU.

Of course, it should be appreciated that, prior to transmitting the MPDU, the MPDU transmission method may further include generating the MPDU.

In the embodiments of the present disclosure, indication information may be transmitted through transmitting the MPDU not including the RAR message corresponding to the MAC sub-header, it is able to improve the resource utilization.

In a possible embodiment of the present disclosure, the second MAC sub-header may be used to indicate a beam failure recovery request response. Further, the second MAC sub-header may include an RAR message indication field, and the RAR message indication field may be used to indicate whether there is a subsequent RAR message after the second MAC sub-header.

As shown in FIG. 8, the RAR message indication field may include an extended bit E, a type bit T, an RAR message indication field I, and a BI/RAPID field. There is no RAR message corresponding to the MAC sub-header, so as to indicate the beam failure recovery request response. In addition, the RAR message indication field I may be used to indicate whether there is the subsequent RAR message after the MAC sub-header.

Alternatively, in a possible embodiment of the present disclosure, the second MAC sub-header may include the RAR message indication field, and the RAR message indication field may be used to indicate whether there is a subsequent RAR message after the second MAC sub-header. As shown in FIG. 8, the MAC sub-header may indicate whether there is the subsequent RAR message after the second MAC sub-header through the RAR message indication field I, but may not indicate the beam failure recovery request response additionally.

It should be appreciated that, the RAR message indication field may use a reserved bit in the MAC sub-header, or one or more newly-added bits in the MAC sub-header different from the reserved bit.

Alternatively, in a possible embodiment of the present disclosure, the second MAC sub-header may include a response indication field, and the response indication field may be used to indicate the beam failure recovery request response. As shown in FIG. 8, the MAC sub-header may indicate the beam failure recovery request response through the response indication field I.

It should be appreciated that, the response indication field may use a reserved bit in the MAC sub-header, or one or more newly-added bits in the MAC sub-header different from the reserved bit.

Alternatively, in a possible embodiment of the present disclosure, Step S1301 may include: determining a resource position of the MPDU in accordance with the beam failure recovery request response, the resource position of the MPDU being used to indicate the beam failure recovery request response; and transmitting the MPDU at the resource position.

Alternatively, in a possible embodiment of the present disclosure, Step S1301 may include: determining a position of the MPDU in accordance with whether there is a subsequent RAR message after the second MAC sub-header, the resource position being used to indicate whether there is the subsequent RAR message after the second MAC sub-header; and transmitting the MPDU at the resource position.

The present disclosure further provides in some embodiments an MPDU transmission method for a UE as shown in FIG. 14, which includes Step S1401 of receiving an MPDU, the MPDU being used to indicate types of formats of one or more RAR messages in the MPDU; and Step S1402 of parsing the MPDU.

According to the embodiments of the present disclosure, through receiving and parsing the MPDU for indicating the format types of the one or more RAR messages, it is able for a network device and the UE to use different formats of the RAR messages according to the practical need and achieve different functions through different information carried in the RAR messages, thereby to enlarge an available range of a random access process, and enable the network device and the UE to exchange messages in more flexible and convenient manner.

In a possible embodiment of the present disclosure, at least one first MAC sub-header of the MPDU may include an RAR format indication field, and the RAR format indication field may be used to indicate a format of at least one first RAR message corresponding to each first MAC sub-header.

Step S1402 may include parsing the first RAR message in accordance with the format of the RAR message indicated by the RAR format indication field in the first MAC sub-header.

In some embodiments of the present disclosure, through parsing the MPDU in accordance with the format of the RAR message corresponding to the MAC sub-header indicated by the RAR format indication field in the MAC sub-header, it is to support the MPDU to set different formats for the RAR messages corresponding to different MAC sub-headers.

In a possible embodiment of the present disclosure, the RAR format indication field may be used to indicate whether the at least one first RAR message is an RAR message including a response indication field, and the response indication field may be used to indicate a beam failure recovery request response.

In a possible embodiment of the present disclosure, the RAR format indication field may use a reserved bit in the MAC sub-header, or one or more newly-added bits in the MAC sub-header different from the reserved bit.

In a possible embodiment of the present disclosure, the RAR format indication field may indicate the format of the at least one first RAR message through indicating at least one of the following information types to be carried in the at least one first RAR message: a TA command; a UL grant; a response indication field indicating the beam failure recovery request response; a T-C-RNTI; acknowledgement information about a downlink beam in candidate downlink beams reported by the UE corresponding to a currently-used uplink beam; acknowledgement information about downlink beams other than the downlink beam in the candidate downlink beams reported by the UE corresponding to the currently-used uplink beam; an indicator indicating the handover to the other candidate downlink beam; an indicator indicating the handover to the other downlink beam; an indicator indicating the restart of beam searching; an indicator indicating the handover to the other candidate beam or the restart of the beam searching; an indicator indicating available downlink beams in the candidate downlink beams reported by the UE; and an indicator indicating the available downlink beams.

In a possible embodiment of the present disclosure, the MPDU transmission method may further include acquiring resource position information about the MPDU. There may exist a mapping between resource positions of the MPDU and the formats of the first RAR message included in the MPDU.

Step S1402 may include parsing the one or more RAR messages in the MPDU in accordance with the formats of the one or more RAR messages indicated by the resource position information.

Further, the resource position information may include at least one of a time-domain resource position, a frequency-domain resource position, a preamble position, a beam resource position, and a frequency-domain/time-domain resource position of an SS block/CSI-RS corresponding to a beam.

In a possible embodiment of the present disclosure, the resource position information may be used to indicate whether at least one first RAR message corresponding to any first MAC sub-header in the MPDU is an RAR message including a response indication field, and the response indication field may be used to indicate the beam failure recovery request response.

In a possible embodiment of the present disclosure, the resource position information may indicate the format of the at least one first RAR message through indicating at least one of the following information types to be carried in the at least one first RAR message corresponding to any first MAC sub-header in the MPDU: a TA command; a UL grant; a T-C-RNTI; a response indication field indicating the beam failure recovery request response; acknowledgement information about a downlink beam in candidate downlink beams reported by the UE corresponding to a currently-used uplink beam; acknowledgement information about downlink beams other than the downlink beam in the candidate downlink beams reported by the UE corresponding to the currently-used uplink beam; an indicator indicating the handover to the other candidate downlink beam; an indicator indicating the handover to the other downlink beam; an indicator indicating the restart of beam searching; an indicator indicating the handover to the other candidate beam or the restart of the beam searching; an indicator indicating available downlink beams in the candidate downlink beams reported by the UE; and an indicator indicating the available downlink beams.

In a possible embodiment of the present disclosure, when the RAR message includes the response indication field, the response indication field may use a reserved bit in the RAR message, or one or more newly-added bits in the RAR message different from the reserved bit.

In a possible embodiment of the present disclosure, each first RAR message in the at least one RAR message corresponding to the first MAC sub-header may be used to carry one or more of the information types.

In a possible embodiment of the present disclosure, the MPDU may further include a second MAC sub-header, and no RAR message corresponding to the second MAC sub-header may be included in the MPDU.

Step S1402 may further include parsing the second MAC sub-header in the MPDU.

In a possible embodiment of the present disclosure, the second MAC sub-header may be used to indicate the beam failure recovery request response. Step S1402 may further include parsing the second MAC sub-header in the MPDU so as to acquire the beam failure recovery request response.

Further, the second MAC sub-header may include an RAR message indication field, and the RAR message indication field may be used to indicate whether there is a subsequent RAR message after the second MAC sub-header. Step S1402 may further include parsing the second MAC sub-header in the MPDU so as to determine whether there is a subsequent RAR message after the second MAC sub-header.

In a possible embodiment of the present disclosure, the second MAC sub-header may include a response indication field, and the response indication field may be used to indicate the beam failure recovery request response. Step S1402 may further include parsing the response indication field of the second MAC sub-header in the MPDU, so as to acquire the beam failure recovery request response.

Further, the response indication field may use a reserved bit in the MAC sub-header, or one or more newly-added bits in the MAC sub-header different from the reserved bit.

In a possible embodiment of the present disclosure, the MPDU transmission method may further include acquiring resource position information about the MPDU. A resource position of the MPDU may be used to indicate the beam failure recovery request response. Step S1402 may include determining the beam failure recovery request response in accordance with the resource position information.

In a possible embodiment of the present disclosure, the MPDU transmission method may further include acquiring resource position information about the MPDU, and a resource position of the MPDU may be used to indicate whether there is a subsequent RAR message after the second MAC sub-header. Step S1402 may include determining whether there is the subsequent RAR message after the second MAC sub-header in accordance with the resource position information.

In a possible embodiment of the present disclosure, Step S1402 may include parsing the MPDU in accordance with an arrangement mode of the MAC sub-headers and the RAR messages in the MPDU. The MAC sub-headers and the RAR messages may be arranged in the MPDU as follows: each MAC sub-header may be located in an MAC header of the MPDU, and the RAR messages corresponding to the MAC sub-headers may be located after the MAC header in accordance with an order of the MAC sub-headers; or each MAC sub-header may be located in the MAC header of the MPDU, and the RAR messages corresponding to the MAC sub-headers in the MPDU including the RAR messages corresponding to the MAC sub-headers may be located after the MAC header in accordance with an order of the MAC sub-headers; or the RAR messages corresponding to each MAC sub-header may be located in a field after the corresponding MAC sub-header; or the RAR messages corresponding to each MAC sub-header including the RAR messages may be located in a field after the corresponding MAC sub-header.

The MAC sub-header may be further used to indicate whether there is the corresponding RAR message, or the quantity of the corresponding RAR messages.

In addition, in some embodiments of the present disclosure, the UE may further parse the MPDU with reference to the formats of the MAC sub-header or the RAR message in FIGS. 2-12, which will not be particularly defined herein.

As shown in FIG. 15, the present disclosure further provides in some embodiments an MPDU transmission method, which includes Step S1501 of receiving an MPDU, the MPDU including a second MAC sub-header, and no RAR message corresponding to the second MAC sub-header being included in the MPDU; and Step S1502 of parsing the MPDU.

According to the embodiments of the present disclosure, indication information may be transmitted through receiving the MPDU including no RAR message corresponding to the MAC sub-header, so as to improve the resource utilization.

In a possible embodiment of the present disclosure, the second MAC sub-header may be used to indicate a beam failure recovery request response. Step S1502 may further include parsing the second MAC sub-header in the MPDU so as to acquire the beam failure recovery request response.

Further, the second MAC sub-header may include an RAR message indication field, and the RAR message indication field may be used to indicate whether there is a subsequent RAR message after the second MAC sub-header. Step S1502 may further include parsing the second MAC sub-header in the MPDU so as to determine whether there is the subsequent RAR message after the second MAC sub-header.

In a possible embodiment of the present disclosure, the second MAC sub-header may include a response indication field, and the response indication field may be used to indicate the beam failure recovery request response. Step S1502 may further include parsing the response indication field of the second MAC sub-header in the MPDU, so as to acquire the beam failure recovery request response.

Further, the response indication field may use a reserved bit in the MAC sub-header, or one or more newly-added bits in the MAC sub-header different from the reserved bit.

In a possible embodiment of the present disclosure, the MPDU transmission method may further include acquiring resource position information about the MPDU, and a resource position of the MPDU may be used to indicate the beam failure recovery request response. Step S1502 may include determining the beam failure recovery request response in accordance with the resource position information.

In a possible embodiment of the present disclosure, the MPDU transmission method may further include acquiring resource position information about the MPDU, and a resource position of the MPDU may be used to indicate whether there is the subsequent RAR message after the second MAC sub-header. Step S1502 may include determining whether there is the subsequent RAR message after the second MAC sub-header in accordance with the resource position information.

As shown in FIG. 16, the present disclosure further provides in some embodiments a network device 1600 which includes a generation unit 1601 and a transmission unit 1602. The generation unit 1601 is configured to generate an MPDU. The transmission unit 1602 is configured to transmit the MPDU. The MPDU may be used to indicate types of formats of one or more RAR messages in the MPDU.

According to the embodiments of the present disclosure, through transmitting the MPDU indicating the types of the formats of the RAR message, it is able for the network device and a UE to use different formats of the RAR messages according to the practical need and achieve different functions through different information carried in the RAR messages, thereby to enlarge an available range of a random access process, and enable the network device and the UE to exchange messages in more flexible and convenient manner.

In a possible embodiment of the present disclosure, at least one first MAC sub-header of the MPDU may include an RAR format indication field for indicating a format of at least one first RAR message corresponding to the first MAC sub-header. Further, the RAR format indication field may use a reserved bit in the MAC sub-header, or one or more newly-added bits in the MAC sub-header different from the reserved bit. The RAR format indication field may include one or more bits.

In a possible embodiment of the present disclosure, the RAR format indication field may indicate whether the at least one first RAR message is an RAR message including a response indication field, and the response indication field may be used to indicate a beam failure recovery request response.

In a possible embodiment of the present disclosure, the RAR format indication field may indicate the format of the at least one first RAR message through indicating at least one of the following information types to be carried in the at least one first RAR message: a TA command; a UL grant; a T-C-RNTI; a response indication field indicating the beam failure recovery request response; acknowledgement information about a downlink beam in candidate downlink beams reported by the UE corresponding to a currently-used uplink beam; acknowledgement information about downlink beams other than the downlink beam in the candidate downlink beams reported by the UE corresponding to the currently-used uplink beam; an indicator indicating the handover to the other candidate downlink beam; an indicator indicating the handover to the other downlink beam; an indicator indicating the restart of beam searching; an indicator indicating the handover to the other candidate beam or the restart of the beam searching; an indicator indicating available downlink beams in the candidate downlink beams reported by the UE; and an indicator indicating the available downlink beams.

In a possible embodiment of the present disclosure, the transmission unit 1602 is further configured to transmit the MPDU at a resource position of the MPDU corresponding to the format of the first RAR message. There may exist a mapping between resource positions of the MPDU and formats of the first RAR message in the MPDU. Resource position information may include at least one of a time-domain resource position, a frequency-domain resource position, a preamble position, a beam resource position, and a frequency-domain/time-domain resource position of an SS block/CSI-RS corresponding to a beam.

In a possible embodiment of the present disclosure, the resource position information may be used to indicate whether at least one first RAR message corresponding to any first MAC sub-header in the MPDU is an RAR message including a response indication field, and the response indication field may be used to indicate a beam failure recovery request response.

In a possible embodiment of the present disclosure, the resource position information may be used to indicate a format of the at least one first RAR message through indicating at least one of the following information types to be carried in the at least one first RAR message corresponding to any first MAC sub-header in the MPDU: a TA command; a UL grant; a T-C-RNTI; a response indication field indicating the beam failure recovery request response; acknowledgement information about a downlink beam in candidate downlink beams reported by the UE corresponding to a currently-used uplink beam; acknowledgement information about downlink beams other than the downlink beam in the candidate downlink beams reported by the UE corresponding to the currently-used uplink beam; an indicator indicating the handover to the other candidate downlink beam; an indicator indicating the handover to the other downlink beam; an indicator indicating the restart of beam searching; an indicator indicating the handover to the other candidate beam or the restart of the beam searching; an indicator indicating available downlink beams in the candidate downlink beams reported by the UE; and an indicator indicating the available downlink beams.

In a possible embodiment of the present disclosure, when the first RAR message is used to carry the at least one of the information types, each first RAR message in the at least one RAR message corresponding to the first MAC sub-header may be used to carry one or more of the at least one information type.

In a possible embodiment of the present disclosure, when the first RAR message includes a response indication field, the response indication information may use a reserved bit in the RAR message, or one or more newly-added bits in the RAR message different from the reserved bit.

In a possible embodiment of the present disclosure, the MPDU may further include a second MAC sub-header, and no RAR message corresponding to the second MAC sub-header may be included in the MPDU.

In a possible embodiment of the present disclosure, the second MAC sub-header may be used to indicate the beam failure recovery request response.

In a possible embodiment of the present disclosure, the second MAC sub-header may include a response indication field for indicating the beam failure recovery request response. The response indication field may use a reserved bit in the MAC sub-header, or one or more newly-added bits in the MAC sub-header different from the reserved bit.

In a possible embodiment of the present disclosure, the second MAC sub-header may include an RAR message indication field for indicating whether there is a subsequent RAR message after the second MAC sub-header. It should be appreciated that, an implementation mode of the RAR message indication field may be used in combination with any of the above-mentioned two implementation modes.

In a possible embodiment of the present disclosure, the transmission unit 1602 is further configured to: determine the resource positon of the MPDU in accordance with the beam failure recovery request response, the resource position of the MPDU being used to indicate the beam failure recovery request response; and transmitting the MPDU at the resource position.

In a possible embodiment of the present disclosure, the transmission unit 1602 is further configured to: determine the resource position of the MPDU in accordance with whether there is the subsequent RAR message after the second MAC sub-header, the resource position being used to indicate whether there is the subsequent RAR message after the second MAC sub-header; and transmitting the MPDU at the resource position.

In a possible embodiment of the present disclosure, the MAC sub-headers and the RAR messages may be arranged in the MPDU as follows: each MAC sub-header may be located in an MAC header of the MPDU, and the RAR messages corresponding to the MAC sub-headers may be located after the MAC header in accordance with an order of the MAC sub-headers; or each MAC sub-header may be located in the MAC header of the MPDU, and the RAR messages corresponding to the MAC sub-headers in the MPDU including the RAR messages corresponding to the MAC sub-headers may be located after the MAC header in accordance with an order of the MAC sub-headers; or the RAR messages corresponding to each MAC sub-header may be located in a field after the corresponding MAC sub-header; or the RAR messages corresponding to each MAC sub-header including the RAR messages may be located in a field after the corresponding MAC sub-header.

The MAC sub-header may be further used to indicate whether there is the corresponding RAR message, or the quantity of the corresponding RAR messages.

The network device 1600 may also be used to implement the MPDU transmission method in FIG. 1 and transmit the MPDU in the formats as shown in FIGS. 2-12. The implementation thereof may refer to that in FIG. 1.

Figure 17:
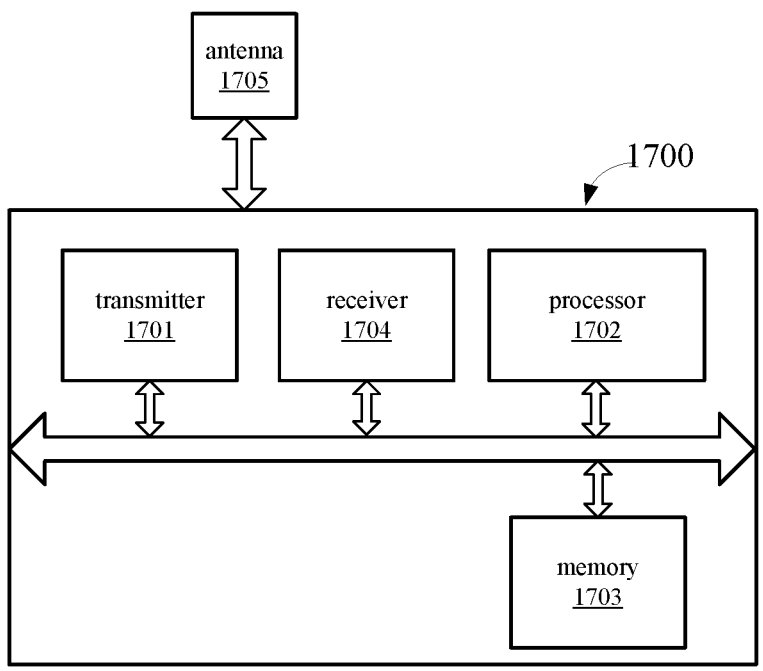
FIG. 17 is another schematic view showing the network device according to some embodiments of the present disclosure.

As shown in FIG. 17, the present disclosure further provides in some embodiments a network device 1700, which includes a processor 1702, a memory 1703, a transmitter 1701 and a receiver 1704. In actual use, the transmitter 1701 and the receiver 1704 may be coupled to an antenna 1705.

The memory 1703 is configured to store therein a program. To be specific, the program may include a program code, and the program code may include a computer-executable instruction. The memory 1703 may include a Read-Only Memory (ROM) and a Random Access Memory (RAM), and it is configured to provide instructions and data to the processor 1702. The memory 1703 may include a high-speed RAM or a non-volatile memory, e.g., at least one magnetic disk.

The processor 1702 is configured to execute the program stored in the memory 1703.

To be specific, in the network device 1700, the processor 1702 is further configured to, through the receiver 1704 and the transmitter 1701, generate the MPDU and transmit the MPDU. The MPDU may be used to indicate types of formats of one or more RAR messages in the MPDU.

The above-mentioned method for the network device or a base station in FIG. 1 may be applied to, or implemented by, the processor 1702. The processor 1702 may be an integrated circuit (IC) having a signal processing capability. During the implementation, the steps of the above-mentioned method may be completed through an integrated logic circuit of hardware in the processor 1702 or instructions in the form of software. The processor 1702 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a Programmable ROM (PROM), an Electrically Erasable PROM (EEPROM), or a register. The storage medium may be located in the memory 1703, and the processor 1702 may read information stored in the memory 1703, so as to implement the steps of the method in conjunction with the hardware.

The network device 1700 may be further used to implement the method in FIG. 1 and achieve the functions of the network device or the base station in FIG. 1, which will not be particularly defined herein.

The present disclosure further provides in some embodiments a computer-readable storage medium storing therein an MPDU transmission program. The MPDU transmission program is executed by a processor so as to implement the MPDU transmission method in FIG. 1.

Figure 18:
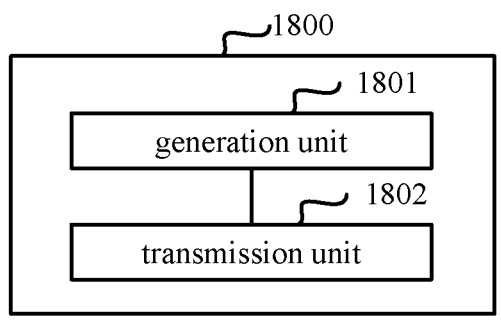
FIG. 18 is yet another schematic view showing the network device according to some embodiments of the present disclosure.

As shown in FIG. 18, the present disclosure further provides in some embodiments a network device 1800 which includes a generation unit 1801 and a transmission unit 1802. The generation unit 1801 is configured to generate an MPDU, and the MPDU may include a second MAC sub-header, and no RAR message corresponding to the second MAC sub-header may be included in the MPDU. The transmission unit 1802 is configured to transmit the MPDU.

According to the embodiments of the present disclosure, indication information may be transmitted through transmitting the MPDU not including the RAR message corresponding to the MAC sub-header, it is able to improve the resource utilization.

In a possible embodiment of the present disclosure, the second MAC sub-header may be used to indicate a beam failure recovery request response.

In a possible embodiment of the present disclosure, the second MAC sub-header may include a response indication field for indicating the beam failure recovery request response. The response indication field may use a reserved bit in the MAC sub-header, or one or more newly-added bits in the MAC sub-header different from the reserved bit.

In a possible embodiment of the present disclosure, the second MAC sub-header may include an RAR message indication field for indicating whether there is a subsequent RAR message after the second MAC sub-header. It should be appreciated that, the implementation mode of the RAR message indication field may be used in combination with any of the above two implementation modes.

In a possible embodiment of the present disclosure, the transmission unit 1802 is further configured to: determine a resource position of the MPDU in accordance with the beam failure recovery request response, the resource position of the MPDU being used to indicate the beam failure recovery request response; and transmit the MPDU at the resource position.

In a possible embodiment of the present disclosure, the transmission unit 1802 is further configured to: determine a resource position of the MPDU in accordance with whether there is a subsequent RAR message after the second MAC sub-header, the resource position being used to indicate whether there is the subsequent RAR message after the second MAC sub-header; and transmit the MPDU at the resource position.

The network device 1800 may further be used to implement the method in FIG. 13, and transmit the MPDU in the format in FIG. 8. The implementation thereof may refer to that in FIG. 13.

Figure 19:
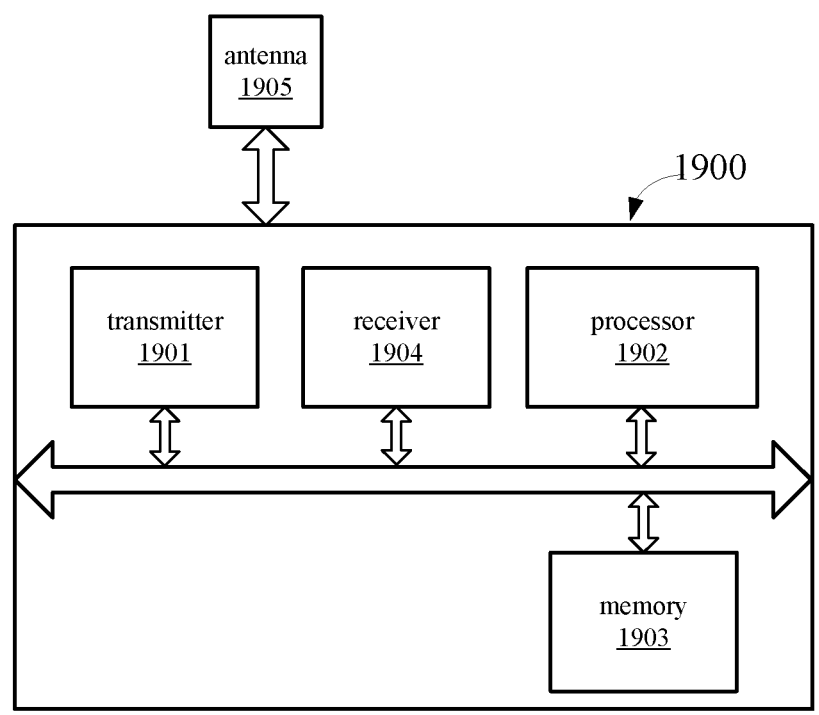
FIG. 19 is still yet another schematic view showing the network device according to some embodiments of the present disclosure.

As shown in FIG. 19, the present disclosure further provides in some embodiments a network device 1900, which includes a processor 1902, a memory 1903, a transmitter 1901 and a receiver 1904. In actual use, the transmitter 1901 and the receiver 1904 may be coupled to an antenna 1905.

The memory 1903 is configured to store therein a program. To be specific, the program may include a program code, and the program code may include a computer-executable instruction. The memory 1903 may include an ROM and an RAM, and it is configured to provide instructions and data to the processor 1902. The memory 1903 may include a high-speed RAM or a non-volatile memory, e.g., at least one magnetic disk.

The processor 1902 is configured to execute the program stored in the memory 1903.

To be specific, in the network device 1900, the processor 1902 is configured to, through the receiver 1904 and the transmitter 1901: generate an MPDU, the MPDU including a second MAC sub-header, no RAR message corresponding to the second MAC sub-header being included in the MPDU; and transmit the MPDU.

The above-mentioned method for the network device or a base station in FIG. 13 may be applied to, or implemented by, the processor 1902. The processor 1902 may be an IC having a signal processing capability. During the implementation, the steps of the above-mentioned method may be completed through an integrated logic circuit of hardware in the processor 1902 or instructions in the form of software. The processor 1902 may be a general-purpose processor, a digital signal processor, an ASIC, an FPGA or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 1903, and the processor 1902 may read information stored in the memory 1903 so as to implement the steps of the method in conjunction with the hardware.

The network device 1900 may be further used to implement the method in FIG. 13 and achieve the functions of the network device or the base station in FIG. 13, which will not be particularly defined herein.

The present disclosure further provides in some embodiments a computer-readable storage medium storing therein an MPDU transmission program. The MPDU transmission program is executed by a processor so as to implement the MPDU transmission method in FIG. 13.

Figure 20:
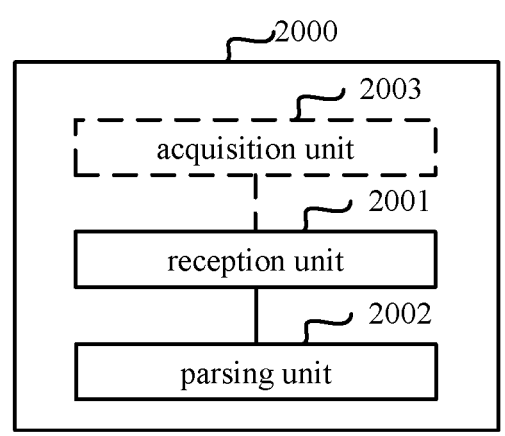
FIG. 20 is a schematic view showing a UE according to some embodiments of the present disclosure.

As shown in FIG. 20, the present disclosure further provides in some embodiments a UE 2000 which includes a reception unit 2001 and a parsing unit 2002. The reception unit 2001 is configured to receive an MPDU, and the MPDU may be used to indicate types of formats of one or more RAR messages in the MPDU. The parsing unit 2002 is configured to parse the MPDU.

According to the embodiments of the present disclosure, through receiving and parsing the MPDU for indicating the format types of the one or more RAR messages, it is able for a network device and the UE to use different formats of the RAR messages according to the practical need and achieve different functions through different information carried in the RAR messages, thereby to enlarge an available range of a random access process, and enable the network device and the UE to exchange messages in more flexible and convenient manner.

In a possible embodiment of the present disclosure, at least one first MAC sub-header of the MPDU may include an RAR format indication field for indicating a format of at least one first RAR message corresponding to each first MAC sub-header.

The parsing unit 2002 is further configured to parse the first RAR message in accordance with the format of the RAR message indicated by the RAR format indication field in the second MAC sub-header.

In some embodiments of the present disclosure, through parsing the MPDU in accordance with the format of the RAR message corresponding to the MAC sub-header indicated by the RAR format indication field in the MAC sub-header, it is to support the MPDU to set different formats for the RAR messages corresponding to different MAC sub-headers.

In a possible embodiment of the present disclosure, the RAR format indication field may be used to indicate whether the at least one first RAR message is an RAR message including a response indication field, and the response indication field may be used to indicate a beam failure recovery request response.

In a possible embodiment of the present disclosure, the RAR format indication field may use a reserved bit in the MAC sub-header, or one or more newly-added bits in the MAC sub-header different from the reserved bit.

In a possible embodiment of the present disclosure, the RAR format indication field may indicate the format of the at least one first RAR message through indicating at least one of the following information types to be carried in the at least one first RAR message: a TA command; a UL grant; a response indication field indicating the beam failure recovery request response; a T-C-RNTI; acknowledgement information about a downlink beam in candidate downlink beams reported by the UE corresponding to a currently-used uplink beam; acknowledgement information about downlink beams other than the downlink beam in the candidate downlink beams reported by the UE corresponding to the currently-used uplink beam; an indicator indicating the handover to the other candidate downlink beam; an indicator indicating the handover to the other downlink beam; an indicator indicating the restart of beam searching; an indicator indicating the handover to the other candidate beam or the restart of the beam searching; an indicator indicating available downlink beams in the candidate downlink beams reported by the UE; and an indicator indicating the available downlink beams.

In a possible embodiment of the present disclosure, the UE 2000 may further include an acquisition unit 2003 configured to acquire resource position information about the MPDU. There may exist a mapping between resource positions of the MPDU and the formats of the first RAR message included in the MPDU.

The parsing unit 2002 is further configured to parse the one or more RAR messages in the MPDU in accordance with the formats of the one or more RAR messages indicated by the resource position information.

Further, the resource position information may include at least one of a time-domain resource position, a frequency-domain resource position, a preamble position, a beam resource position, and a frequency-domain/time-domain resource position of an SS block/CSI-RS corresponding to a beam.

In a possible embodiment of the present disclosure, the resource position information may be used to indicate whether at least one first RAR message corresponding to any first MAC sub-header in the MPDU is an RAR message including a response indication field, and the response indication field may be used to indicate the beam failure recovery request response.

In a possible embodiment of the present disclosure, the resource position information may indicate the format of the at least one first RAR message through indicating at least one of the following information types to be carried in the at least one first RAR message corresponding to any first MAC sub-header in the MPDU: a TA command; a UL grant; a T-C-RNTI; a response indication field indicating the beam failure recovery request response; acknowledgement information about a downlink beam in candidate downlink beams reported by the UE corresponding to a currently-used uplink beam; acknowledgement information about downlink beams other than the downlink beam in the candidate downlink beams reported by the UE corresponding to the currently-used uplink beam; an indicator indicating the handover to the other candidate downlink beam; an indicator indicating the handover to the other downlink beam; an indicator indicating the restart of beam searching; an indicator indicating the handover to the other candidate beam or the restart of the beam searching; an indicator indicating available downlink beams in the candidate downlink beams reported by the UE; and an indicator indicating the available downlink beams.

In a possible embodiment of the present disclosure, when the RAR message includes the response indication field, the response indication field may use a reserved bit in the RAR message, or one or more newly-added bits in the RAR message different from the reserved bit.

In a possible embodiment of the present disclosure, each first RAR message in the at least one RAR message corresponding to the first MAC sub-header may be used to carry one or more of the information types.

In a possible embodiment of the present disclosure, the MPDU may further include a second MAC sub-header, and no RAR message corresponding to the second MAC sub-header may be included in the MPDU. The parsing unit 2002 is further configured to parse the second MAC sub-header in the MPDU.

In a possible embodiment of the present disclosure, the second MAC sub-header may be used to indicate the beam failure recovery request response. The parsing unit 2002 is further configured to parse the second MAC sub-header in the MPDU so as to acquire the beam failure recovery request response.

In a possible embodiment of the present disclosure, the second MAC sub-header may include a response indication field for indicating the beam failure recovery request response. The parsing unit 2002 is further configured to parse the response indication field of the second MAC sub-header in the MPDU, so as to acquire the beam failure recovery request response.

Further, the response indication field may use a reserved bit in the MAC sub-header, or one or more newly-added bits in the MAC sub-header different from the reserved bit.

In a possible embodiment of the present disclosure, the second MAC sub-header may include an RAR message indication field for indicating that there is a subsequent RAR message after the second MAC sub-header. The parsing unit 2002 is further configured to parse the second MAC sub-header in the MPDU so as to determine whether there is the subsequent RAR message after the second MAC sub-header.

It should be appreciated that, the implementation mode of the RAR message indication field may be used in combination with any one of the above two implementation modes.

In a possible embodiment of the present disclosure, the UE 2000 may further include an acquisition unit 2003 configured to acquire resource position information about the MPDU. A resource position of the MPDU may be used to indicate the beam failure recovery request response. The parsing unit 2002 is further configured to determine the beam failure recovery request response in accordance with the resource position information.

In a possible embodiment of the present disclosure, the UE 2000 may further include an acquisition unit 2003 configured to acquire resource position information about the MPDU, and a resource position of the MPDU may be used to indicate whether there is a subsequent RAR message after the second MAC sub-header. The parsing unit 2002 is further configured to determine whether there is the subsequent RAR message after the second MAC sub-header in accordance with the resource position information.

In a possible embodiment of the present disclosure, the parsing unit 2002 is further configured to parse the MPDU in accordance with an arrangement mode of the MAC sub-headers and the RAR messages in the MPDU. The MAC sub-headers and the RAR messages may be arranged in the MPDU as follows: each MAC sub-header may be located in an MAC header of the MPDU, and the RAR messages corresponding to the MAC sub-headers may be located after the MAC header in accordance with an order of the MAC sub-headers; or each MAC sub-header may be located in the MAC header of the MPDU, and the RAR messages corresponding to the MAC sub-headers in the MPDU including the RAR messages corresponding to the MAC sub-headers may be located after the MAC header in accordance with an order of the MAC sub-headers; or the RAR messages corresponding to each MAC sub-header may be located in a field after the corresponding MAC sub-header; or the RAR messages corresponding to each MAC sub-header including the RAR messages may be located in a field after the corresponding MAC sub-header.

Further, the MAC sub-header may be used to indicate whether there is the corresponding RAR message, or the quantity of the corresponding RAR messages.

The UE 2000 may further be used to implement the method in FIG. 14, and parse the MPDU in accordance with the formats in FIGS. 2-12.

Figure 21:
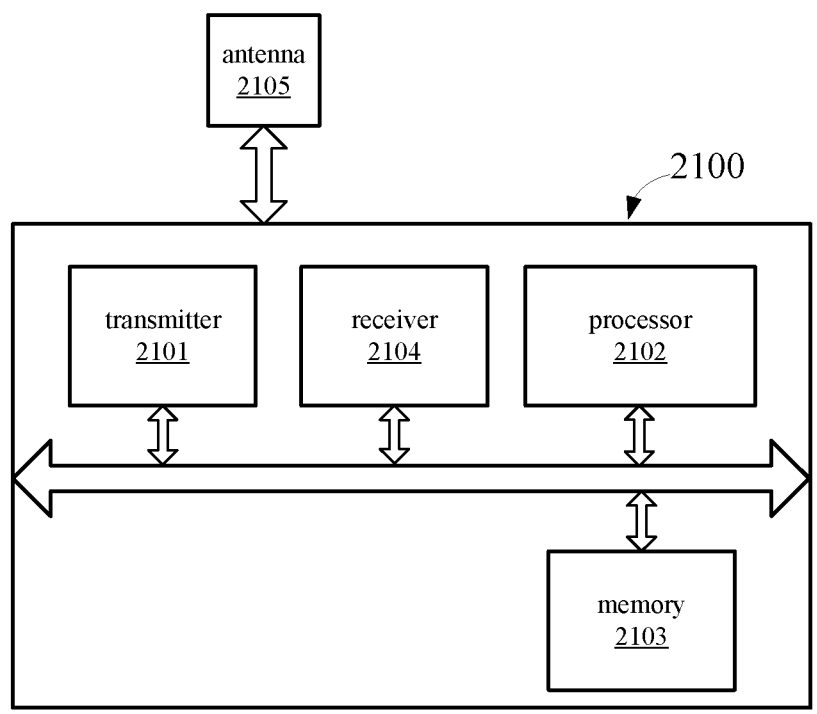
FIG. 21 is another schematic view showing the UE according to some embodiments of the present disclosure.

As shown in FIG. 21, the present disclosure further provides in some embodiments a UE 2100 which includes a processor 2102, a memory 2103, a transmitter 2101 and a receiver 2104. In actual use, the transmitter 2101 and the receiver 2104 may be coupled to an antenna 2105.

The memory 2103 is configured to store therein a program. To be specific, the program may include a program code, and the program code may include a computer-executable instruction. The memory 2103 may include an ROM and an RAM, and it is configured to provide instructions and data to the processor 2102. The memory 2103 may include a high-speed RAM or a non-volatile memory, e.g., at least one magnetic disk.

The processor 2102 is configured to execute the program stored in the memory 2103.

To be specific, in the UE 2100, the processor 2102 is configured to, through the receiver 2104 and the transmitter 2101: receive an MPDU, the MPDU being used to indicate types of formats of one or more RAR messages in the MPDU; and parse the MPDU.

The above-mentioned method for the network device or a base station in FIG. 14 may be applied to, or implemented by, the processor 2102. The processor 2102 may be an IC having a signal processing capability. During the implementation, the steps of the above-mentioned method may be completed through an integrated logic circuit of hardware in the processor 2102 or instructions in the form of software. The processor 2102 may be a general-purpose processor, a digital signal processor, an ASIC, an FPGA or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 2103, and the processor 2102 may read information stored in the memory 2103 so as to implement the steps of the method in conjunction with the hardware.

The UE 2100 may be further used to implement the method in FIG. 14 and achieve the functions of the UE in FIG. 14, which will not be particularly defined herein.

The present disclosure further provides in some embodiments a computer-readable storage medium storing therein an MPDU transmission program. The MPDU transmission program is executed by a processor so as to implement the MPDU transmission method in FIG. 14.

Figure 22:
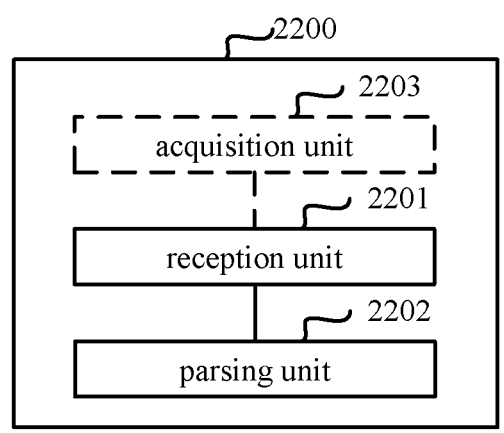
FIG. 22 is yet another schematic view showing the UE according to some embodiments of the present disclosure.

As shown in FIG. 22, the present disclosure further provides in some embodiments a UE 2200 which includes a reception unit 2201 and a parsing unit 2202. The reception unit 2201 is configured to receive an MPDU. The MPDU may include a second MAC sub-header, and no RAR message corresponding to the second MAC sub-header may be included in the MPDU. The parsing unit 2202 is configured to parse the MPDU.

According to the embodiments of the present disclosure, indication information may be transmitted through receiving the MPDU including no RAR message corresponding to the MAC sub-header, so as to improve the resource utilization.

In a possible embodiment of the present disclosure, the second MAC sub-header may be used to indicate a beam failure recovery request response. The parsing unit 2202 is further configured to parse the second MAC sub-header in the MPDU, so as to acquire the beam failure recovery request response.

In a possible embodiment of the present disclosure, the second MAC sub-header may include a response indication field for indicating the beam failure recovery request response. The parsing unit 2202 is further configured to parse the response indication field of the second MAC sub-header in the MPDU, so as to acquire the beam failure recovery request response.

Further, the response indication field may use a reserved bit in the MAC sub-header, or one or more newly-added bits in the MAC sub-header different from the reserved bit.

In a possible embodiment of the present disclosure, the second MAC sub-header may include an RAR message indication field for indicating whether there is a subsequent RAR message after the second MAC sub-header. The parsing unit 2202 is further configured to parse the second MAC sub-header in the MPDU, so as to determine whether there is the subsequent RAR message after the second MAC sub-header.

In a possible embodiment of the present disclosure, the method may further include acquiring resource position information about the MPDU, and a resource position of the MPDU may be used to indicate the beam failure recovery request response. The parsing unit 2202 is further configured to determine the beam failure recovery request response in accordance with the resource position information.

In a possible embodiment of the present disclosure, the method may further include acquiring resource position information about the MPDU, and a resource position of the MPDU may be used to indicate whether there is the subsequent RAR message after the second MAC sub-header. The parsing unit 2202 is further configured to determine whether there is the subsequent RAR message after the second MAC sub-header in accordance with the resource position information.

The UE 2200 may be further used to implement the method in FIG. 15, and the implementation may refer to that in FIG. 15.

Figure 23:
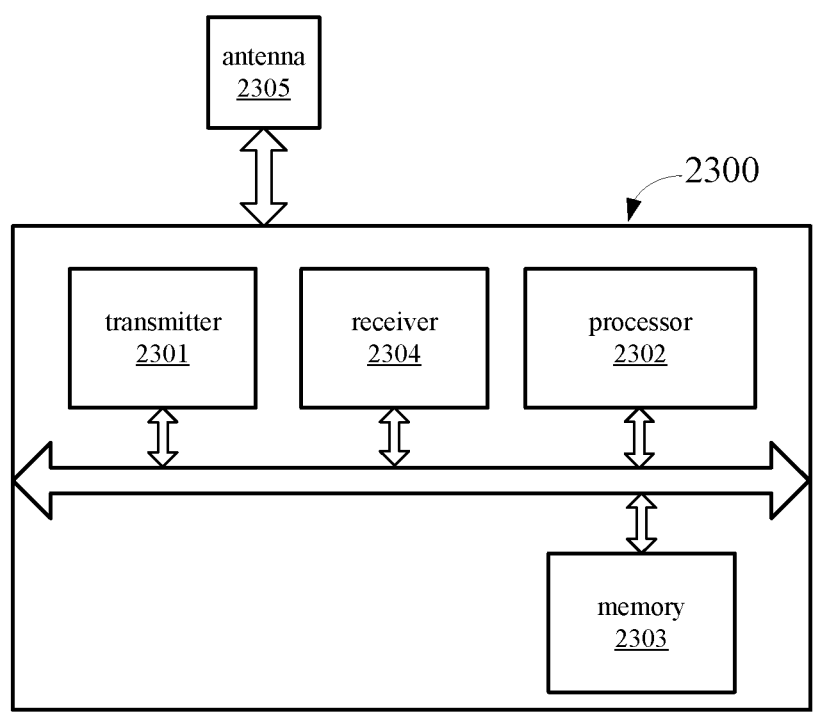
FIG. 23 is still yet another schematic view showing the UE according to some embodiments of the present disclosure.

As shown in FIG. 23, the present disclosure further provides in some embodiments a UE 2300 which includes a processor 2302, a memory 2303, a transmitter 2301 and a receiver 2304. In actual use, the transmitter 2301 and the receiver 2304 may be coupled to an antenna 2305.

The memory 2303 is configured to store therein a program. To be specific, the program may include a program code, and the program code may include a computer-executable instruction. The memory 2303 may include an ROM and an RAM, and it is configured to provide instructions and data to the processor 2302. The memory 2303 may include a high-speed RAM or a non-volatile memory, e.g., at least one magnetic disk.

The processor 2302 is configured to execute the program stored in the memory 2303.

To be specific, in the UE 2300, the processor 2302 is configured to, through the receiver 2304 and the transmitter 2301: receive an MPDU, the MPDU including a second MAC sub-header, and no RAR message corresponding to the second MAC sub-header being included in the MPDU; and parse the MPDU.

The above-mentioned method for the network device or a base station in FIG. 15 may be applied to, or implemented by, the processor 2302. The processor 2302 may be an IC having a signal processing capability. During the implementation, the steps of the above-mentioned method may be completed through an integrated logic circuit of hardware in the processor 2302 or instructions in the form of software. The processor 2302 may be a general-purpose processor, a digital signal processor, an ASIC, an FPGA or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 2303, and the processor 2302 may read information stored in the memory 2303 so as to implement the steps of the method in conjunction with the hardware.

The UE 2300 may be further used to implement the method in FIG. 15 and achieve the functions of the UE in FIG. 15, which will not be particularly defined herein.

The present disclosure further provides in some embodiments a computer-readable storage medium storing therein an MPDU transmission program. The MPDU transmission program is executed by a processor so as to implement the MPDU transmission method in FIG. 15.

The present disclosure at least has the following technical effect. Through transmitting the MPDU capable of indicating the types of the formats of the one or more RAR messages, it is able for the network device and the UE to use different formats of the RAR messages according to the practical need, thereby to enable the network device and the UE to exchange messages in more flexible and convenient manner.

In a word, the above are merely the preferred embodiments of the present disclosure, but shall not be used to define the scope of the present disclosure. Any modifications, equivalents or improvements made within the spirit and principle of the present disclosure shall also fall within the scope of the present disclosure.

The system, devices, modules or units mentioned hereinabove may be implemented through a computer chip or entity, or by a product having a certain function. Typically, the device may be a computer. To be specific, the computer may be a personal computer, a laptop computer, a cellular phone, a camera phone, a smart phone, a Personal Digital Assistant (PDA), a Media Player, a navigation device, an E-mail device, a game console, a flat-panel computer, a wearable device or a combination thereof.

The computer-readable storage medium may include volatile or nonvolatile, mobile or immobile storage medium capable of storing therein information using any method or technique. The information may be a computer-readable instruction, a data structure, a program or any other data. The computer-readable storage medium may include, but not limited to, an RAM (e.g., Phase Change Random Access Memory (PRAM), SRAM or Dynamic Random Access Memory (DRAM)), an ROM (e.g., an Electrically Erasable Programmable Read Only Memory (EEPROM), a flash memory, a Compact Disc Read Only Memory (CD-ROM) or a Digital Video Disk (DVD)), a magnetic storage device (e.g., a cassette magnetic tape or a magnetic disk), or any other non-transmission medium capable of storing therein information which can be accessed by a computing device. As defined in the present disclosure, the computer-readable storage medium may not include any transitory media, e.g., modulated data signal or carrier.

It should be further appreciated that, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The above embodiments have been described in a progressive manner, and the same or similar contents in the embodiments will not be repeated, i.e., each embodiment merely focuses on the difference from the others. Especially, the system embodiments are substantially similar to the method embodiments, so they may be described in a simple manner, and the relevant description may refer to that in the method embodiments.

What is claimed is:

1. A Media Access Control (MAC) Protocol Data Unit (MPDU) transmission method, comprising:
  transmitting an MPDU, wherein the MPDU is used to indicate types of formats of one or more Random Access Response (RAR) messages in the MPDU,
  wherein the MPDU comprises a first MAC sub-header and a second MAC sub-header, and no Random Access Response (RAR) message corresponding to the second MAC sub-header is comprised in the MPDU; and
  wherein the second MAC sub-header is used to indicate the beam failure recovery request response; or
  wherein the second MAC sub-header comprises a response indication field for indicating the beam failure recovery request response.

2. The MPDU transmission method according to claim 1, wherein at least one first MAC sub-header of the MPDU comprises an RAR format indication field for indicating a format of at least one first RAR message corresponding to the first MAC sub-header.

3. The MPDU transmission method according to claim 2, wherein the RAR format indication field uses a reserved bit in the MAC sub-header, or one or more newly-added bits in the MAC sub-header different from the reserved bit.

4. The MPDU transmission method according to claim 2, wherein the RAR format indication field indicates the format of the at least one first RAR message through indicating at least one of the following information types to be carried in the at least one first RAR message: a Timing Advance (TA) command; an uplink (UL) grant; a Temporary Cell Radio Network Temporary Identifier (T-C-RNTI); a response indication field indicating the beam failure recovery request response; acknowledgement information about a downlink beam in candidate downlink beams reported by a User Equipment (UE) corresponding to a currently-used uplink beam; acknowledgement information about downlink beams other than the downlink beam in the candidate downlink beams reported by the UE corresponding to the currently-used uplink beam; an indicator indicating the handover to the other candidate downlink beam; an indicator indicating the handover to the other downlink beam; an indicator indicating the restart of beam searching; an indicator indicating the handover to the other candidate beam or the restart of the beam searching; an indicator indicating available downlink beams in the candidate downlink beams reported by the UE; and an indicator indicating the available downlink beams.

5. The MPDU transmission method according to claim 4, wherein each first RAR message in the at least one RAR message corresponding to the first MAC sub-header is used to carry one or more of the at least one information type.

6. The MPDU transmission method according to claim 1, wherein the response indication field uses a reserved bit in the MAC sub-header, or one or more newly-added bits in the MAC sub-header different from the reserved bit.

7. The MPDU transmission method according to claim 1, wherein the transmitting the MPDU comprises:
  determining a resource position of the MPDU in accordance with the beam failure recovery request response, the resource position of the MPDU being used to indicate the beam failure recovery request response; and
  transmitting the MPDU at the resource position.

8. The MPDU transmission method according to claim 1, wherein the transmitting the MPDU comprises:
  determining a resource position of the MPDU in accordance with whether there is a subsequent RAR message after the second MAC sub-header, the resource position being used to indicate whether there is the subsequent RAR message after the second MAC sub-header; and
  transmitting the MPDU at the resource position.

9. The MPDU transmission method according to claim 1, wherein the MAC sub-headers and the RAR messages in the MPDU are arranged as follows:
- each MAC sub-header is located in an MAC header of the MPDU, and the RAR messages corresponding to the MAC sub-headers are located after the MAC header in accordance with an order of the MAC sub-headers; or
- each MAC sub-header is located in the MAC header of the MPDU, and the RAR messages corresponding to the MAC sub-headers in the MPDU comprising the RAR messages corresponding to the MAC sub-headers are located after the MAC header in accordance with an order of the MAC sub-headers; or
- the RAR messages corresponding to each MAC sub-header is located in a field after the corresponding MAC sub-header; or
- the RAR messages corresponding to each MAC sub-header comprising the RAR messages are located in a field after the corresponding MAC sub-header.

10. A network device, comprising a processor, and a memory storing therein a computer-executable instruction, wherein the processor is configured to execute the computer-executable instruction so as to implement the MPDU transmission method according to claim 1.

11. A Media Access Control (MAC) Protocol Data Unit (MPDU) transmission method, comprising:
- generating an MPDU, wherein the MPDU comprises a first MAC sub-header and a second MAC sub-header, and no Random Access Response (RAR) message corresponding to the second MAC sub-header is comprised in the MPDU; and
- transmitting the MPDU;
- wherein the second MAC sub-header is used to indicate the beam failure recovery request response; or
- wherein the second MAC sub-header comprises a response indication field for indicating the beam failure recovery request response.

12. The MPDU transmission method according to claim 11, wherein the response indication field uses a reserved bit in the MAC sub-header, or one or more newly-added bits in the MAC sub-header different from the reserved bit.

13. The MPDU transmission method according to claim 11, wherein the transmitting the MPDU comprises:
- determining a resource position of the MPDU in accordance with the beam failure recovery request response, the resource position of the MPDU being used to indicate the beam failure recovery request response; and
- transmitting the MPDU at the resource position.

14. The MPDU transmission method according to claim 11, wherein the transmitting the MPDU comprises:
- determining a resource position of the MPDU in accordance with whether there is a subsequent RAR message after the second MAC sub-header, the resource position being used to indicate whether there is the subsequent RAR message after the second MAC sub-header; and
- transmitting the MPDU at the resource position.

15. A network device, comprising a processor, and a memory storing therein a computer-executable instruction, wherein the processor is configured to execute the computer-executable instruction so as to implement the MPDU transmission method according to claim 11.

16. A Media Access Control (MAC) Protocol Data Unit (MPDU) transmission method, comprising:
- receiving an MPDU, the MPDU being used to indicate types of formats of one or more RAR messages in the MPDU, wherein the MPDU comprises a first MAC sub-header and a second MAC sub-header, and no Random Access Response (RAR) message corresponding to the second MAC sub-header is comprised in the MPDU; and
- parsing the MPDU;
- wherein the second MAC sub-header is used to indicate the beam failure recovery request response; or
- wherein the second MAC sub-header comprises a response indication field for indicating the beam failure recovery request response.

* * * * *